April 14, 1942.  J. W. GRANT ET AL  2,279,566
VALVE
Filed April 5, 1941  2 Sheets-Sheet 1
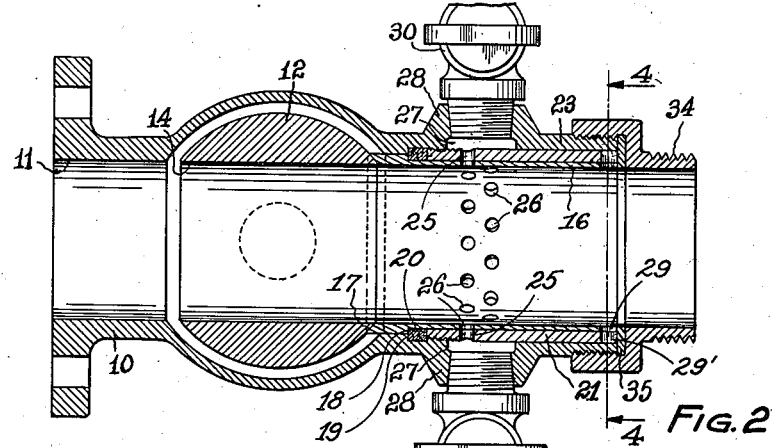
Fig. 2
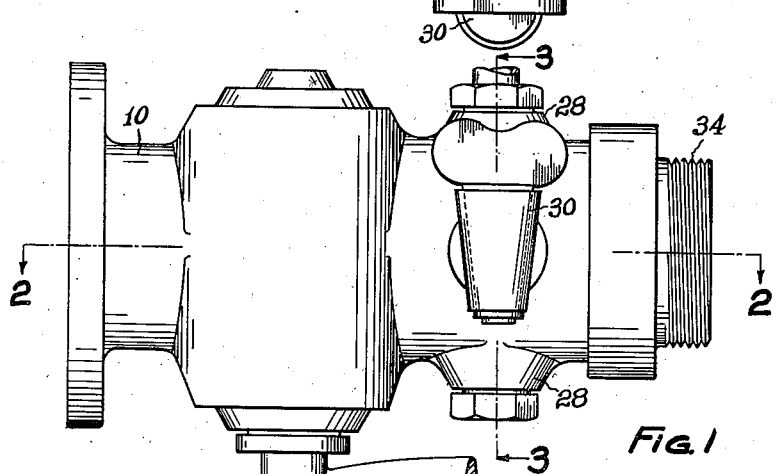
Fig. 1
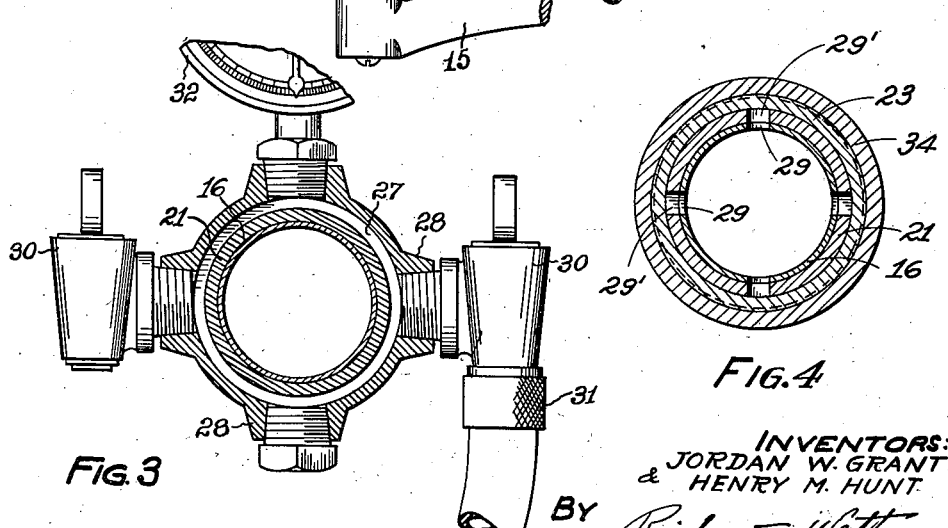
Fig. 3
Fig. 4
INVENTORS:
JORDAN W. GRANT
& HENRY M. HUNT
BY Richey & Watts
ATTORNEYS.

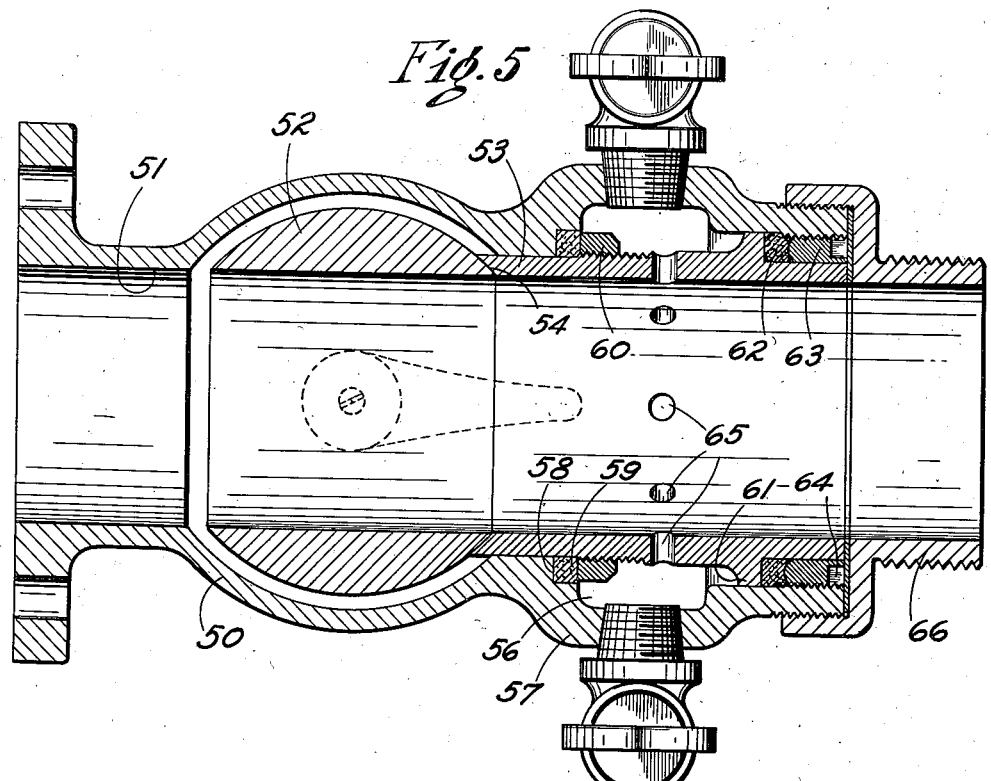
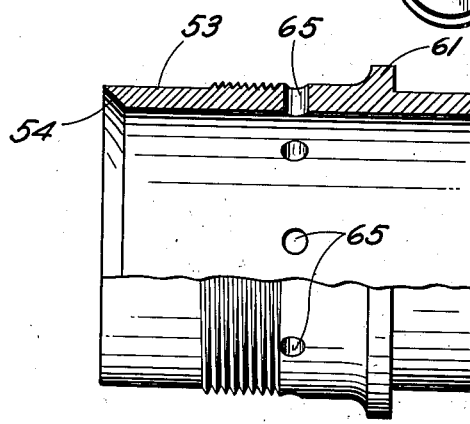

Patented Apr. 14, 1942

2,279,566

UNITED STATES PATENT OFFICE 2,279,566

VALVE

Jordan W. Grant, Portsmouth, Va., and Henry M. Hunt, Wooster, Ohio, assignors to Akron Brass Manufacturing Company, Inc., Wooster, Ohio, a corporation of Ohio Application April 5, 1941, Serial No. 387,056

7 Claims. (Cl. 277—59)

This invention relates to improvements in pressure relief mechanism for valves and couplings of the type commonly used with a fire hose and the like.

One of the objects of the present invention resides in the provision of a valve or coupling having suitable mechanism associated therewith to facilitate the drainage of a hose or pipe line coupled thereto.

Another object of the invention is to provide a valve having a plurality of radial ports formed in the discharge end thereof for by-passing a fluid stream.

A further object of the invention is to construct a valve having a perforate sleeve disposed in the discharge end thereof with a perforate collar encircling a portion of the sleeve, the perforations in said sleeve and collar being aligned and in communication with an annular chamber formed in the valve for relieving the discharge side of the valve of its contents and pressure.

Further objects of the invention are to provide a valve or coupling which is reliable and efficient in service, economic of manufacture, and simple of construction.

Other objects and advantages more or less ancillary to the foregoing and the manner in which all the various objects are realized will appear in the following description, which considered in connection with the accompanying drawings, sets forth the preferred embodiment of the invention.

Referring to the drawings:

Fig. 1 is a side view of a valve embodying the present invention;

Fig. 2 is a longitudinal sectional view of the valve showing a perforate sleeve and collar disposed in the discharge end thereof, the section being taken on a plane indicated by line 2—2 of Fig. 1;

Fig. 3 is a transverse sectional view of the valve, showing a fragmentary portion of a test gauge disposed in one of the radial ports and an auxiliary hose or pipe line connected to a second port, the section being taken on a plane indicated by line 3—3 of Fig. 1;

Fig. 4 is a transverse sectional view of the valve, showing the slots formed in the sleeve and collar, the section being taken on a plane indicated by line 4—4 of Fig. 2;

Fig. 5 is a longitudinal sectional view of a modified form of the valve showing a perforate sleeve disposed in the discharge end thereof; and Fig. 6 is an elevational view of the perforate sleeve shown in Fig. 5.

Referring to Fig. 2, there is shown a valve comprising a casing 10 having an axial bore 11 therethrough to provide a central fluid passageway. Mounted within the casing intermediate its ends there is a valve 12, preferably of the globe type, which is formed with a port 14 of a diameter equal to that of the fluid passageway through the casing. The valve is provided, on opposite sides thereof, with aligned valve stems which are disposed within the casing 10 for the retention of the valve in the axial bore 11. A handle 15 is secured to the end of one of the valve stems for rotating the valve to its open or closed position.

A sleeve or liner 16 formed with an enlarged end portion is disposed within the outlet end of the axial bore 11 with the face 17 of the enlarged end portion configured for intimate engagement with the spherical surface of the valve 12. The face 17 of the sleeve is ground to fit snugly upon the surface of the valve so as to prevent any leakage of fluid therebetween as the valve is rotated to its open or closed position. The internal diameter of the sleeve 16 is equal to the diameter of the fluid port 14 to provide the valve with a continuous and smooth fluid passageway of a constant diameter. The enlarged end of the sleeve forms a ledge 18 on the peripheral surface thereof which is disposed contiguous to and in alignment with a shoulder 19 provided in the casing 10. A resilient packing ring 20 is supported on the ledge 18 and shoulder 19 and is engaged by a collar 21 which encircles the sleeve 16. The collar is threaded within the casing 10 for compressively urging the ring 20 against the ledge and shoulder to seal the valve against the leakage of any fluid therethrough or seepage between the ball valve 12 and face 17 of the sleeve resulting from wear. The threaded adjustment of the collar 21 with respect to the packing ring 20 tends to urge the sleeve 16 towards the valve 12 to compensate for any wear occurring between the face 17 of the sleeve and the spherical surface of the valve.

The collar 21 and sleeve 16 are formed with a plurality of aligned ports or perforations 25 and 26, respectively, which communicate with an annular chamber 27 within the casing 10. Formed in the outer end of the collar 21, Fig. 4, there are slots 29' which are adapted to receive a key wrench to facilitate the threading of the collar into the casing. As the collar 21 is threaded within the casing, the key wrench is adapted to engage the slots 29 provided in the end of the sleeve 16 thereby aligning the slots 29 and 29' contemporaneous the aligning of the ports 25 with the ports 26. The casing is provided with a number of bosses 28 which are spaced about the outer portion of the casing defining the chamber 27. The bosses are drilled and tapped for the reception of drain cocks 30 which may be opened after closure of the valve 12 to relieve the line pressure on the discharge side of the valve and facilitate the drainage of the hose or pipe line extended throughout. However, instead of placing drain cocks in the several bosses, auxiliary hose or pipe lines 31 may be connected with such of the bosses as may accommodate the need, or as shown in Fig. 3, a test gauge 32 may be mounted in one of the bosses.

Threaded upon the casing 10 at the discharge end thereof there is a coupling or connector 34 which accommodates the securement of a nozzle tip, hose or pipe line to the valve. A washer 35 is interposed between the connector 34 and the ends of the sleeve 16 and casing 10 to prevent the leakage of any fluid from the chamber 27.

In the assembly of the valve or coupling, the spherical valve 12 is mounted within the axial bore 11 of the casing 10 with the valve stems thereof journaled in the casing. The handle 15 is secured to an end of one of the valve stems for actuating the valve. The sleeve 16 is then inserted within the discharge end of the casing 10 with the face 17 of the enlarged end portion of the sleeve engaging the spherical surface of the valve 12.

Subsequent the assembly of the sleeve within the casing the resilient packing ring 20 is placed upon the ledge 18 and shoulder 19, whereupon the collar 21 is threaded within the casing 10 and adjusted to urge the packing ring against the ledge and shoulder and also align the ports 25 and 26. The coupling or connector 34 is then secured upon the discharge end of the casing with the washers 35 interposed between the connector and the outer end of the sleeve. The drain cocks 30 or testing gauge 32 may then be secured within the bosses 28.

In the use of the valve or coupling with a hose or pipe line the spherical valve 12 may be rotated to its closed position, whereupon the drain cocks 30 may be opened to relieve the discharge side of the valve and hose line of its pressure and contents. However, instead of having drain cocks disposed within the bosses 28, auxiliary hose or pipe lines may be attached to the bosses to by-pass a portion of the fluid stream flowing through the valve and hose line. With auxiliary lines secured in the bosses the spherical valve is moved to its open position and a portion of the stream flowing through the casing 10 is directed through the perforations in the sleeve and collar to the annular chamber in the casing from where it is delivered to the auxiliary lines. Upon the securement of several auxiliary lines to the casing a testing gauge may be inserted within one of the bosses 28 to determine the pressure in the subdivided lines.

In the modified form of the valve shown in Fig. 5, the casing 50 is provided with an axial bore 51 having a spherical valve 52 mounted therein in the same manner as that disclosed in Fig. 2. Within the casing 50 at the outlet end of the axial bore 51 there is a sleeve or liner 53, the inner face 54 of which is formed for intimate engagement with the spherical surface of the valve 52. The face 54 of the sleeve is ground to fit snugly upon the surface of the valve so as to prevent the leakage of any fluid therebetween as the valve is rotated to its open or closed position. The internal diameter of the sleeve 53 is equal to the diameter of the fluid port formed in the valve 52 to provide a continuous and smooth fluid passageway through the valve.

The casing is formed with an annular chamber 56 and bosses 57 for the reception of drain cocks or auxiliary hose lines in the manner as disclosed in Fig. 2. Formed in the casing 50 contiguous the annular chamber 56 there is a ledge 58 which is adapted to receive a resilient packing ring 59. A nut 60 is threaded on the sleeve 53, within the central portion thereof, for compressively urging the packing ring 59 against the ledge 58 and sleeve 53 to seal the valve against the leakage of any fluid past the ball valve 52 and face 54 of the sleeve.

An annular rib 61 is formed on the peripheral surface of the sleeve 53 contiguous the outer end thereof and is adapted to have a resilient packing ring 62 compressively urged thereagainst by a collar 63 threaded within the outer end of the casing. The threaded adjustment of the collar 63 with respect to the packing ring 62 not only prevents the leakage of fluid past the rib 61 but also urges the sleeve 53 towards the valve 52 and compensates for wear occurring between the face 54 of the sleeve and the spherical surface of the valve. The outer end of the collar 63 is provided with slots 64 for the reception of a key wrench to facilitate the threading of the collar within the casing. The sleeve 53 is provided, intermediate its ends, with a plurality of ports or perforations 65 which communicate with the annular chamber 56 formed within the casing 50.

A coupling or connector 66 is secured to the end of the casing in a manner similar to that disclosed in Fig. 2.

In the assembly of the valve or coupling shown in Fig. 5, the spherical valve 52 is mounted within the axial bore 51 in the same manner as the valve shown in Fig. 2. Prior to the assembly of the sleeve 53 within the casing 50 the resilient packing ring 59 and nut 60 are placed upon the sleeve after which the sleeve is inserted within the casing with the packing ring seated upon the ledge 58.

Subsequent the assembly of the sleeve within the casing the resilient packing ring 62 is placed upon the body of the sleeve, whereupon the collar 63 is threaded within the casing 50 and adjusted to urge the packing ring against the annular rib 61 formed on the peripheral surface of the sleeve. Furthermore, the threading of the collar 63 within the casing tends to urge the nut 60 against the packing ring 59 to seal the valve. The coupling or connector 66 is then secured upon the discharge end of the casing.

The valve or coupling disclosed in Fig. 5 is adapted to be used in conjunction with a hose or pipe line in the same manner and for the same purposes as the valve shown in Fig. 2.

The use and function of the valve or coupling shown in Fig. 5 is similar to the valve disclosed in Fig. 2.

Although the foregoing description is necessarily of a detailed character, in order that the invention may be completely set forth, it is to be understood that the specific terminology is not intended to be restrictive or confining, and that various rearrangements of parts and modifications of detail may be resorted to without departing from the scope or spirit of the invention as herein claimed.

We claim:

1. A valve comprising a casing having a bore therethrough, a spherical valve mounted therein, a perforate sleeve in said bore engaging said spherical valve, said casing having a plurality of radial ports therein communicating with said perforate sleeve, a ring interposed between said sleeve and casing adjacent said ports and means on said sleeve engageable with said ring for sealing said casing with respect to said sleeve.

2. In a valve embodying a casing having a bore therethrough, a ball valve mounted therein, said casing having a chamber therein, a cylindrical tubular member disposed within the discharge end of said casing and seated on said ball valve, a portion of said member having a plurality of perforations therein communicating with said chamber, a sealing ring disposed between said tubular member and casing intermediate said ball valve and chamber, bosses disposed on the peripheral surface of the casing in communication with said chamber and means in said bosses to facilitate the by-passing of a portion of a stream flowing through said valve.

3. In a valve embodying a casing having a bore therethrough, a ball valve mounted therein, said casing having an annular chamber formed within the discharge end thereof, a perforated cylindrical tubular member in the discharge end of the casing with one end thereof disposed in intimate engagement with said ball valve to form a fluid seal therewith, said casing having a plurality of radial ports formed therein in communication with said chamber, a ledge on the periphery of said tubular member adjacent one end thereof, a packing ring seated on said ledge, and a perforated collar threaded within said bore engaging said ring to seal said bore with respect to said member contemporaneous the aligning of the perforations in said member and collar with said chamber.

4. In a valve embodying a casing having a bore therethrough, a spherical valve mounted therein, said casing having an annular chamber therein with a plurality of ports radiating therefrom, a sleeve having an enlarged end portion, disposed in the casing with the enlarged end portion engaging said valve, said sleeve having perforations therein communicating with the chamber to facilitate the by-passing of a portion of a stream flowing therethrough, a ledge on the periphery of the sleeve, a shoulder in said bore adjacent the ledge, a ring seated on said ledge and shoulder, a perforate collar encircling said sleeve within said casing and engaging said ring whereby the enlarged end portion of the sleeve is urged towards the valve to seal said bore with respect to said sleeve.

5. In a valve embodying a casing having a bore therethrough, a ball valve mounted therein, said casing having a chamber therein, a perforated tubular member in the discharge end of the casing, a perforated collar threaded within said casing and telescopically engaging said tubular member, sealing means interposed between said tubular member and casing, said collar and tubular member provided with slots in the outer end thereof to effect the alignment of the ports in said tubular member and collar with said chamber and with one another.

6. In a valve embodying a casing having a bore therethrough, a ball valve mounted therein, said casing having an annular chamber formed within the discharge end thereof, a perforated cylindrical tubular member in the discharge end of the casing with one end thereof disposed in intimate engagement with said ball valve to form a fluid seal therewith, said casing having a plurality of radial ports formed therein in communication with said chamber, a ledge on the periphery of said tubular member adjacent one end thereof, a packing ring seated on said ledge, and a collar threaded within said bore engaging said ring to seal said bore with respect to said member and retain the perforations in said member in alignment with said chamber.

7. In a valve embodying a casing having a bore therethrough, a ball valve mounted therein, said casing having an annular chamber formed within the discharge end thereof, a perforated cylindrical tubular member in the discharge end of the casing with one end thereof disposed in intimate engagement with said ball valve to form a fluid seal therewith, said casing having a plurality of radial ports formed therein in communication with said chamber, a ledge formed in the casing contiguous said chamber, a packing ring seated on said ledge, a nut threaded on said tubular member and engaging said ring to seal said bore with respect to said member, a rib on the periphery of said tubular member adjacent an end thereof, a packing ring seated on said rib and a collar threaded within said bore engaging said ring to seal said bore with respect to said chamber and retain the perforations in said member in alignment with said chamber.

JORDAN W. GRANT.
HENRY M. HUNT.